Patented Oct. 18, 1932

1,883,442

UNITED STATES PATENT OFFICE

HERMAN O. AHNELL, OF CHICAGO, ILLINOIS

METHOD OF MAKING BRICK AND THE LIKE

No Drawing.   Application filed September 6, 1930. Serial No. 480,187.

This invention relates to the art of making brick and the like and among other objects aims to permit bricks and analogous articles to be made from clays containing limestone, without the deleterious results frequently accompanying the presence of limestone in the clay which results in "blowing" or breaking of the brick.

I accomplish this result by subjecting the brick, after burning and preferably immediately thereafter, to a spray or bath of water, preferably cold. By immediately I mean that the brick is desirably subjected to the water treatment before the brick has stood long enough after burning to permit air to permeate the brick structure. I have found that a period of preferably not more than twenty-four hours should be permitted to elapse before this is done, in the case of the usual kiln run and sometimes this period may be extended to as much as forty-eight hours or three days in the case of an unusually large kiln run. I mean by this that if an unusually large number of bricks is put through a kiln to make a kiln run, the pile formed by those bricks when piled up in accordance with well known brick making practices will form a larger pile than a smaller number of brick making up a kiln run when piled up in the usual way. Since my invention contemplates that the pile itself may be sprayed, the number of bricks in the pile would determine the length of time which it would take the air to permeate the bricks. I have found that bricks and tiles, for example, so treated, even when originally made from clays containing limestone, exhibit no further tendency to "blow" or burst.

In certain localities more limestone is found incorporated in the clay from which bricks are made than in other localities. This limestone is a potential source of weakness in the brick. According to my theory, upon burning of the raw brick containing limestone, unslaked lime is formed from the limestone. This unslaked lime is a potential cause of "blowing" and bursting of the brick due to the capacity of the unslaked lime for producing chemical heat. I have found that by subjecting brick containing such potential heat producing capacity, to water, heat is evolved which removes from the brick all further potential heat producing capacity and the tendency for the brick to "blow" or burst from this cause is removed. As at present advised, treating the articles in accordance with my invention herein described transforms the unslaked lime to slake lime before the air has had an opportunity to combine with the unslaked lime and cause damage to the brick.

Bricks treated in accordance with my disclosure, furthermore, become much harder and stronger than bricks containing said potential heat producing capacity and not so treated.

I have found that the water may be advantageously salted as, for example, by the addition of three pounds of common salt to one hundred gallons of cold water.

Having described my invention, I claim:

1. The method of making bricks and analogous articles containing clay requiring burning which is characterized by the step of subjecting the brick, substantially immediately after burning, to cold water, as and for the purpose set forth.

2. The method of making clay products and analogous articles requiring burning and containing limestone or unslaked lime, which is characterized by the step of subjecting the brick to water substantially immediately after burning, as and for the purpose set forth.

In testimony whereof, I have signed my name to this specification.

HERMAN O. AHNELL.